United States Patent
Yamamoto

(10) Patent No.: US 10,993,306 B2
(45) Date of Patent: Apr. 27, 2021

(54) LIGHT EMISSION CONTROL DEVICE, LIGHT SOURCE DEVICE, AND PROJECTION-TYPE VIDEO DISPLAY APPARATUS

(71) Applicant: SEIKO EPSON CORPORATION, Tokyo (JP)

(72) Inventor: Yuki Yamamoto, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/820,935

(22) Filed: Mar. 17, 2020

(65) Prior Publication Data

US 2020/0305262 A1    Sep. 24, 2020

(30) Foreign Application Priority Data

Mar. 18, 2019    (JP) .............................. JP2019-049462

(51) Int. Cl.
*H05B 47/25*    (2020.01)
*H04N 9/31*    (2006.01)

(52) U.S. Cl.
CPC .......... *H05B 47/25* (2020.01); *H04N 9/3155* (2013.01)

(58) Field of Classification Search
CPC ...... H05B 47/10; H05B 47/25; H04N 9/3155; H04N 21/4122
See application file for complete search history.

(56) References Cited

U.S. PATENT DOCUMENTS

| | | | | |
|---|---|---|---|---|
| 2002/0074953 A1* | 6/2002 | Lovell | ................ | H05B 41/2821 315/248 |
| 2007/0159816 A1* | 7/2007 | Bayat | .................... | F21V 7/0075 362/184 |
| 2007/0182347 A1* | 8/2007 | Shteynberg | ............ | H05B 45/10 315/312 |
| 2007/0257623 A1* | 11/2007 | Johnson | ................. | H05B 45/48 315/193 |
| 2010/0315016 A1* | 12/2010 | Hoogzaad | .............. | H05B 47/10 315/224 |
| 2013/0119883 A1* | 5/2013 | Rudolph | ................. | H05B 45/37 315/210 |

(Continued)

FOREIGN PATENT DOCUMENTS

JP    2017-130332 A    7/2017

*Primary Examiner* — Amy Cohen Johnson
*Assistant Examiner* — Syed M Kaiser
(74) *Attorney, Agent, or Firm* — Oliff PLC

(57) ABSTRACT

A light emission control device includes a detection circuit and a light emission control circuit. The detection circuit detects whether or not a first potential difference across the first resistor is larger than a predetermined value. The light emission control circuit outputs a first control signal for controlling turning on/off of the first switching element and a second control signal for controlling turning on/off of the second switching element. The light emission control circuit sets at least one of the first control signal and the second control signal to a drive stop state to be inactive, when it is detected that the first potential difference is larger than the predetermined value. The light emission control circuit causes a power stop signal to be active, when it is detected that the first potential difference is larger than the predetermined value in the drive stop state.

9 Claims, 10 Drawing Sheets

(56) References Cited

U.S. PATENT DOCUMENTS

| | | | | |
|---|---|---|---|---|
| 2014/0077714 A1* | 3/2014 | Suzuki | ................... | H05B 47/16 |
| | | | | 315/200 R |
| 2014/0139111 A1* | 5/2014 | Lin | ....................... | H05B 45/50 |
| | | | | 315/122 |
| 2014/0300274 A1* | 10/2014 | Acatrinei | ................ | F21K 9/232 |
| | | | | 315/85 |
| 2016/0165682 A1* | 6/2016 | Wu | ....................... | H05B 45/10 |
| | | | | 315/200 R |
| 2017/0295632 A1* | 10/2017 | Sun | ...................... | H04B 7/2656 |
| 2018/0178710 A1* | 6/2018 | Ichikawa | ............... | H02M 3/155 |
| 2018/0180978 A1* | 6/2018 | Yamada | ............... | H05B 47/165 |
| 2020/0374494 A1* | 11/2020 | Yamamoto | ............... | H04N 5/63 |

\* cited by examiner

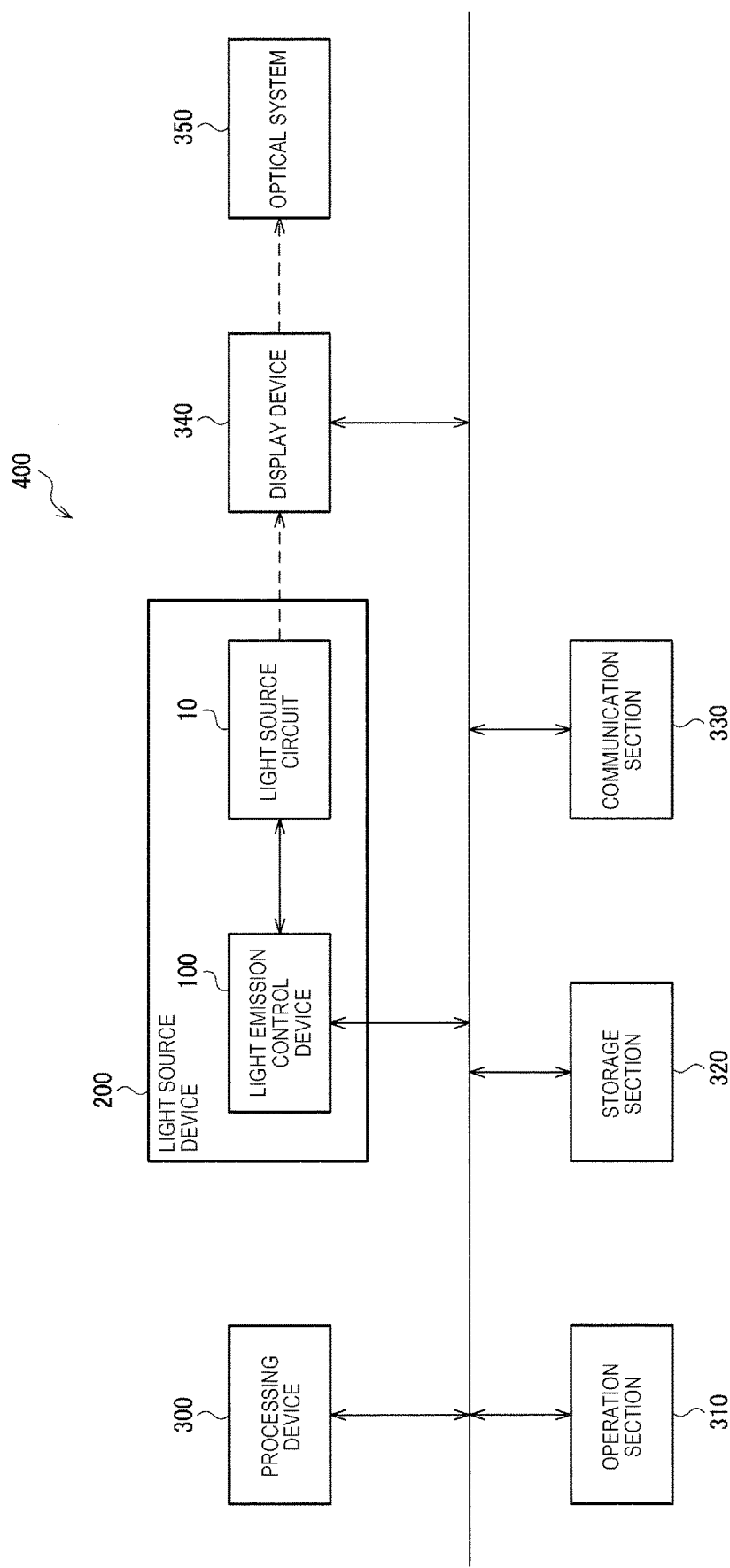

LIGHT EMISSION CONTROL DEVICE, LIGHT SOURCE DEVICE, AND PROJECTION-TYPE VIDEO DISPLAY APPARATUS

The present application is based on, and claims priority from JP Application Serial Number 2019-049462, filed Mar. 18, 2019, the disclosure of which is hereby incorporated by reference herein in its entirety.

BACKGROUND

1. Technical Field

The present disclosure relates to a light emission control device, a light source device, a projection-type video display apparatus, and the like.

2. Related Art

A light emission control device that controls a light source used in a projector or the like is known. The light emission control device controls a light emission amount of a light emission element by controlling a current flowing through the light emission element. The related art of such a light emission control device is disclosed, for example, in JP-A-2017-130332.

JP-A-2017-130332 discloses a method of protecting a light emission element from an overcurrent when the light emission element is short-circuited to a ground. Specifically, the light source device of JP-A-2017-130332 includes a power source section, a light emission element to which a drive current from the power source section is supplied, a switching element for PWM dimming disposed at an upper side of the light emission element, a current detection section that is disposed at the upper side of the light emission element and detects a drive current, and a control section which controls the switching element. When the current detection section detects that the drive current is larger than a decision value, the control section turns off the switching element to interrupt a current path from the power source section to the light emission element.

There are cases where the switching element for PWM dimming is to be provided at a lower side of the light emission element. In this case, even when the switching element is turned off, the current path from the power source to the light emission element is not interrupted, and thus there is a problem that when the light emission element is short-circuited to the ground, the overcurrent may continue to flow through the light emission element.

SUMMARY

An aspect of the present disclosure relates to a light emission control device for controlling a first switching element and a second switching element of a light source circuit including a first resistor, a light emission element, and the first switching element provided in series in this order between a first power node and a first node, and an inductor, the second switching element, and a second resistor provided in series between the first node and a second power node, the device including: a detection circuit detecting whether or not a first potential difference across the first resistor is larger than a predetermined value; and a light emission control circuit outputting a first control signal for controlling turning on/off of the first switching element and a second control signal for controlling turning on/off of the second switching element. The light emission control circuit sets at least one of the first control signal and the second control signal to a drive stop state to be inactive, when it is detected that the first potential difference is larger than the predetermined value, and causes a power stop signal for providing an instruction to stop power supply to the first power node to be active, when it is detected that the first potential difference is larger than the predetermined value in the drive stop state.

BRIEF DESCRIPTION OF THE DRAWINGS

FIG. 10 is a configuration example of a projection-type video display apparatus.

DESCRIPTION OF EXEMPLARY EMBODIMENTS

Hereinafter, preferred embodiments of the present disclosure will be described in detail. In addition, the present embodiments described below do not unduly limit the contents described in the aspects, and all the configurations described in the embodiments are not necessarily essential constituent elements.

1. Light Source Device and Light Emission Control Device

Figure 1:
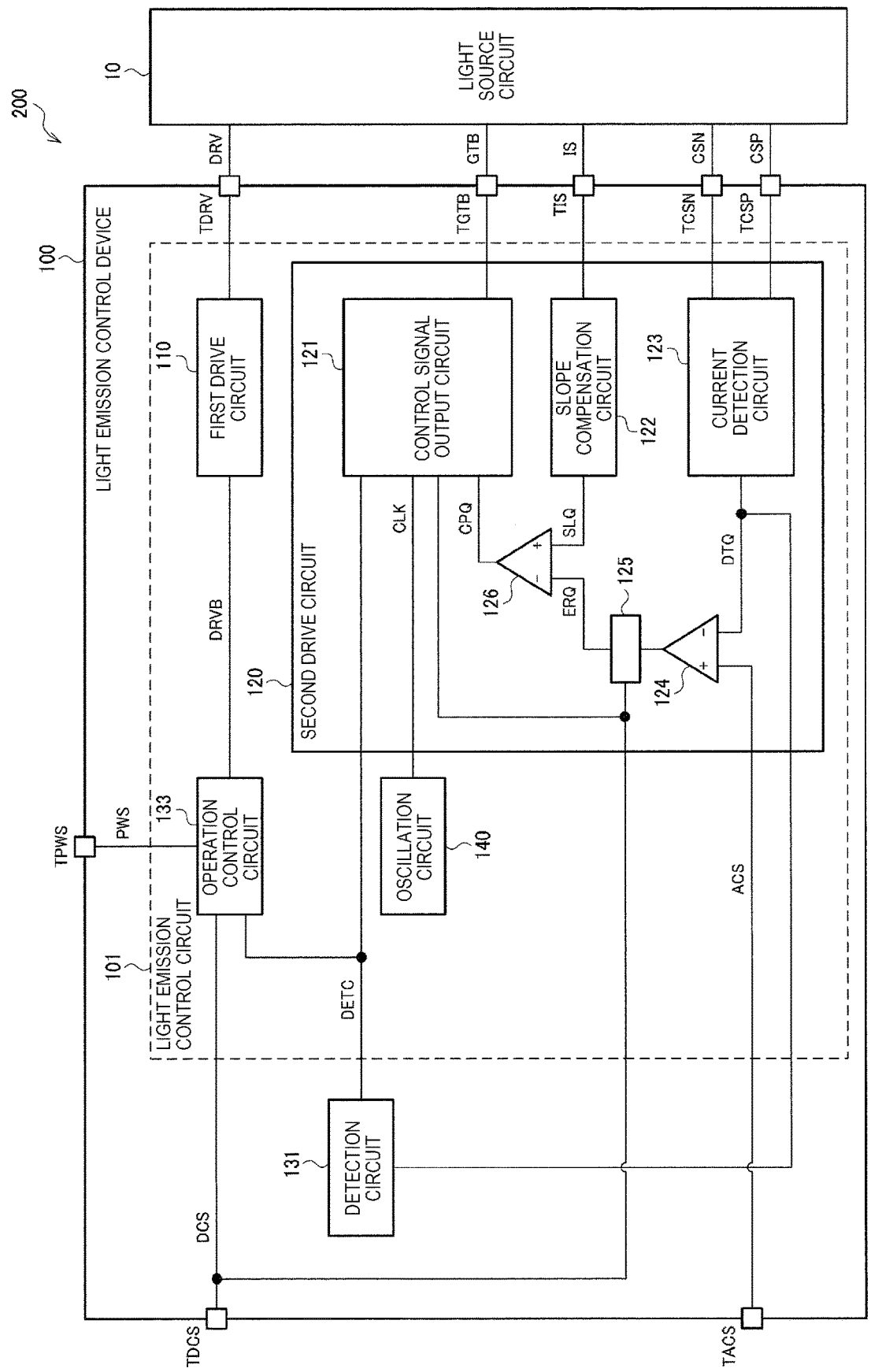
FIG. 1 is a configuration example of a light source device.
Figure 2:
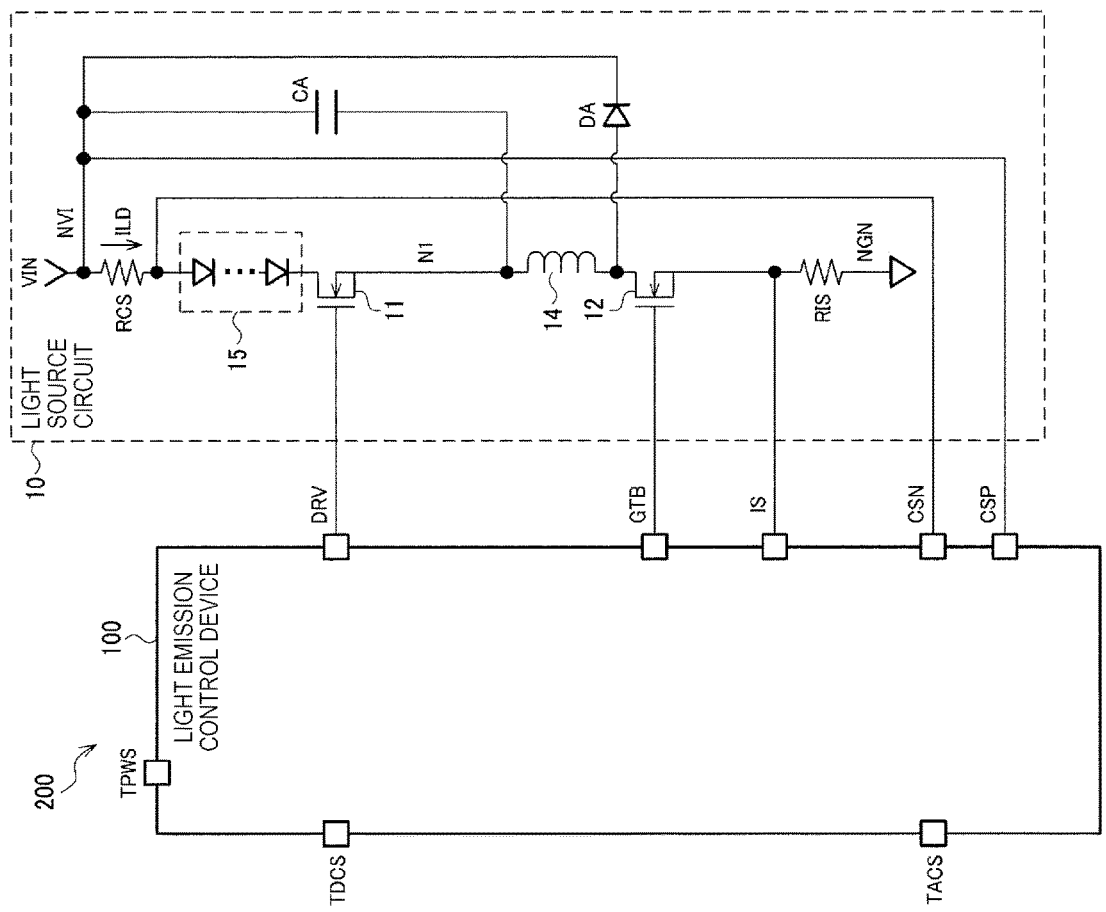
FIG. 2 is a configuration example of the light source device.

FIGS. 1 and 2 are configuration examples of a light source device 200. The light source device 200 includes a light source circuit 10 that is a light emission element and a peripheral circuit thereof, and a light emission control device 100 that controls light emission of the light emission element. The light emission control device 100 is, for example, an integrated circuit device, and is realized by, for example, a semiconductor chip.

First, configurations of the light source circuit 10 and the light emission control device 100 will be described with reference to FIGS. 1 and 2, and a PWM dimming mode and an analog dimming mode will be described with reference to FIGS. 3 and 4. Thereafter, a method of stopping an overcurrent when the light emission element is short-circuited to a ground will be described with reference to FIG. 5 and subsequent figures.

As illustrated in FIG. 2, the light source circuit 10 includes a first switching element 11, a second switching element 12, an inductor 14, and a light emission element 15. The light source circuit 10 includes a first resistor RCS, a second resistor RIS, a capacitor CA, and a diode DA. The first switching element 11 and the second switching element 12 are, for example, N-type transistors.

The light emission element 15 is driven by a current ILD, and emits light with brightness according to a current value of the current ILD. The light emission element 15 is a plurality of laser diodes coupled in series with each other. However, the light emission element 15 may be a single laser diode or a light emitting diode (LED).

The light emission element 15 and the first switching element 11 are provided in series between a first power node NVI and a first node N1. The first node N1 is a node coupled to one end of the inductor 14. The inductor 14, the second switching element 12, and the second resistor RIS are provided in series between the first node N1 and a second power node NGN.

Specifically, the first resistor RCS is coupled between the first power node NVI and one end of the light emission element 15, the other end of the light emission element 15 is coupled to a drain of the first switching element 11, and a source of the first switching element 11 is coupled to one end of the inductor 14. The other end of the inductor 14 is coupled to a drain of the second switching element 12, and the second resistor RIS is coupled between a source of the second switching element 12 and the second power node NGN. A coupling relationship of the capacitor CA and the diode DA is as illustrated in FIG. 2, and an operation of the light source circuit 10 including these circuit elements will be described later with reference to FIGS. 3 and 4.

The first power node NVI is a node to which a first power VIN is input, and the second power node NGN is a node to which a second power is input. A voltage of the first power is higher than a voltage of the second power. The second power is, for example, a ground.

The second switching element 12 performs switching regulation control on a current flowing through the inductor 14. The first switching element 11 controls whether or not the current flowing through the inductor 14 flows through the light emission element 15. Although details will be described later, a mode, in which the first switching element 11 is always turned on and a light emission amount of the light emission element 15 is controlled by the switching regulation control of the second switching element 12, is referred to as an analog dimming mode. Further, a mode, in which the light emission amount of the light emission element 15 is controlled by an on-duty when the first switching element 11 is turned on and off, is referred to as a PWM dimming mode.

As illustrated in FIG. 1, the light emission control device 100 includes a light emission control circuit 101 and a detection circuit 131. The light emission control device 100 includes a PWM terminal TDCS, a dimming voltage input terminal TACS, and terminals TPWS, TDRV, TGTB, TIS, TCSP, and TCSN. The detection circuit 131 may be referred to as an overcurrent detection circuit or a short detection circuit. One of the detection circuit 131 and a current detection circuit 123 which will be described later may be referred to as a first current detection circuit, and the other may be referred to as a second current detection circuit.

A PWM signal DCS used for dimming control in the PWM dimming mode is input from a processing device to the PWM terminal TDCS. A dimming voltage ACS used for dimming control in the analog dimming mode is input from the processing device to the dimming voltage input terminal TACS. The processing device is a host device of the light emission control device 100, and is, for example, a processor such as an MPU or a CPU.

The light emission control circuit 101 dims the light emission amount of the light emission element 15 by performing turning on/off control of the first switching element 11 and the second switching element 12 based on the PWM signal DCS and the dimming voltage ACS. The light emission control circuit 101 includes a first drive circuit 110, a second drive circuit 120, an oscillation circuit 140, and an operation control circuit 133.

The first drive circuit 110 outputs a first control signal DRV for controlling turning on/off of the first switching element 11 based on the PWM signal DCS. Specifically, the operation control circuit 133 outputs the PWM signal DCS as a signal DRVB when a detection signal DETC output from the detection circuit 131 is inactive. The first drive circuit 110 outputs the first control signal DRV based on the signal DRVB. An operation when the detection signal DETC is active will be described later. The first control signal DRV is output from the terminal TDRV and input to a gate of the first switching element 11. The first drive circuit 110 outputs the first control signal DRV for turning on of the first switching element 11 when the PWM signal DCS is active, and outputs the first control signal DRV for turning off of the first switching element 11 when the PWM signal DCS is inactive. The first drive circuit 110 is configured by, for example, a buffer circuit that buffers the signal DRVB, or the like.

The oscillation circuit 140 generates a clock signal CLK. For example, the oscillation circuit 140 is a CR oscillation circuit, a ring oscillator, a multivibrator, or the like.

The second drive circuit 120 outputs a second control signal GTB based on the dimming voltage ACS, the PWM signal DCS, and the clock signal CLK. The second control signal GTB is output from the terminal TGTB and input to a gate of the second switching element 12. The second control signal GTB controls turning on/off of the second switching element 12 in a period in which the PWM signal DCS is active. Specifically, a voltage CSP at one end of the first resistor RCS is input to the terminal TCSP, a voltage CSN at the other end of the first resistor RCS is input to the terminal TCSN, and a voltage IS at one end of the second resistor RIS is input to the terminal TIS. The second drive circuit 120 performs switching regulation control on the current ILD flowing through the light emission element 15 based on the voltages CSP, CSN, and IS, and the dimming voltage ACS, thereby performing control to be the current ILD corresponding to the dimming voltage ACS.

The second drive circuit 120 includes a control signal output circuit 121, a slope compensation circuit 122, a current detection circuit 123, an error amplifier circuit 124, a switch circuit 125, and a comparator 126. Hereinafter, operations of each portion of the second drive circuit 120 and the first drive circuit 110 in each dimming mode will be described with reference to waveform diagrams of FIGS. 3 and 4. In the following description, an active state is set to a high level and an inactive state is set to a low level. It is assumed that the detection signal DETC is inactive.

Figure 3:
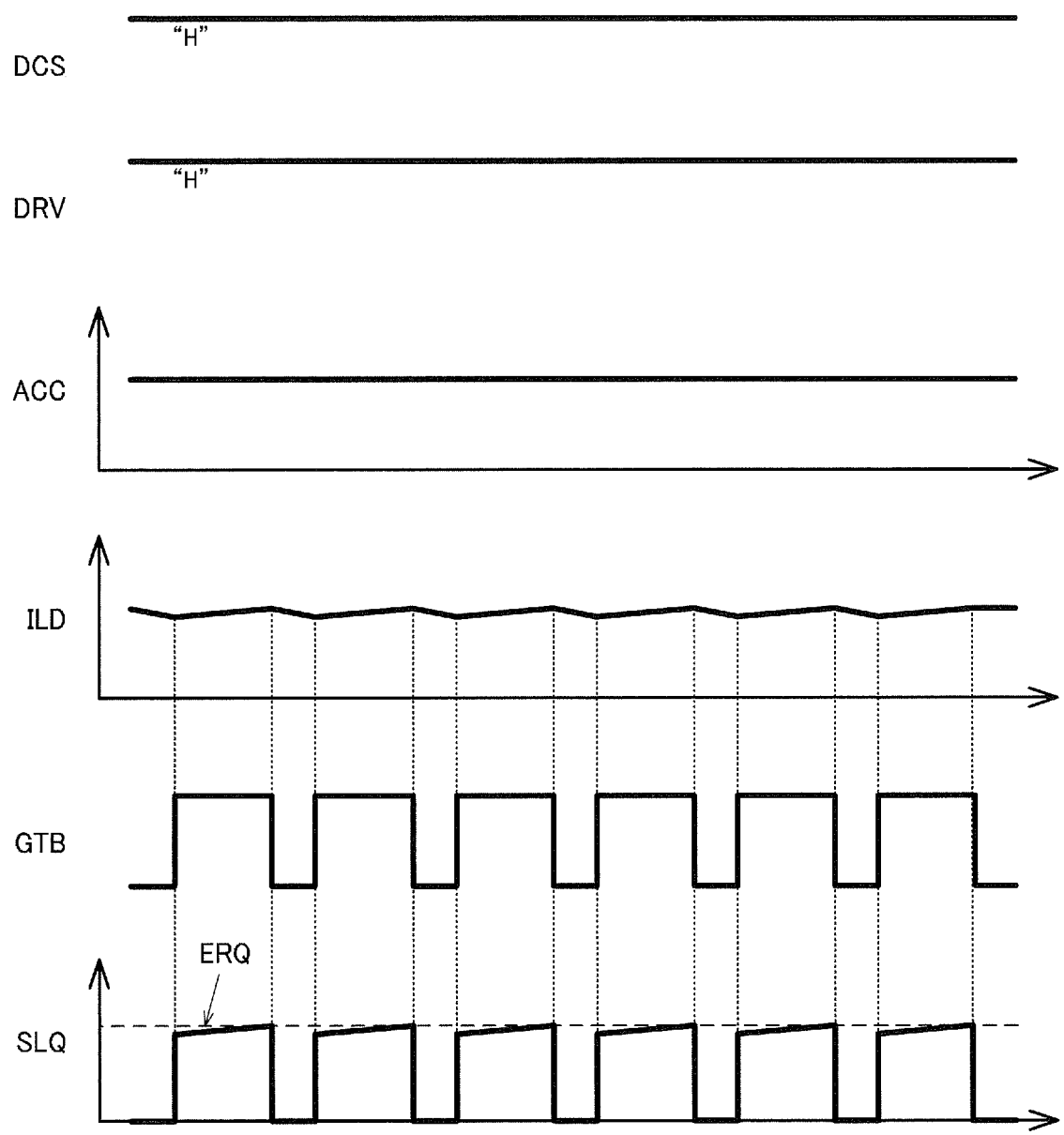
FIG. 3 is a waveform diagram in an analog dimming mode.

FIG. 3 is a waveform diagram in the analog dimming mode. In the analog dimming mode, the PWM signal DCS is at a high level. The first drive circuit 110 always turns on the first switching element 11 by outputting the first control signal DRV of a high level. In the PWM dimming mode, the PWM signal DCS is a rectangular wave having a high width duty of less than 100%. Therefore, the PWM signal DCS that is always at a high level in the analog dimming mode is a PWM signal having a high width duty of 100%.

The current detection circuit 123 outputs a detection voltage DTQ by multiplying a potential difference CSP−CSN=RCS×ILD across the first resistor RCS by a given gain. The error amplifier circuit 124 amplifies a difference between the detection voltage DTQ and the dimming voltage ACS. The switch circuit 125 is turned on when the PWM signal DCS is at a high level, and is turned off when the PWM signal DCS is at a low level. In the analog dimming mode, the switch circuit 125 is always turned on.

The slope compensation circuit 122 increases a slope of the voltage IS over time in order to suppress subharmonic oscillation of the drive current flowing through the laser diode, and outputs a voltage SLQ after the increase in the slope. The comparator 126 compares the voltage SLQ with an output voltage ERQ of the error amplifier circuit 124, outputs a signal CPQ of a low level when SLQ<ERQ, and outputs a signal CPQ of a high level when SLQ>ERQ.

The control signal output circuit 121 allows the second control signal GTB to transition from a low level to a high level at an edge of the clock signal CLK. Since the second switching element 12 is turned on when the second control signal GTB is at a high level, a current flows from the inductor 14 to the second power node NGN via the second switching element 12 and the second resistor RIS. Since the current flowing through the inductor 14 increases, the voltage IS rises and the output voltage SLQ of the slope compensation circuit 122 rises. Since the current flowing through the inductor 14 flows through the light emission element 15 via the first switching element 11, the current ILD flowing through the light emission element 15 also rises.

When SLQ>ERQ, the output signal CPQ of the comparator 126 transitions from a low level to a high level. In this case, the control signal output circuit 121 allows the second control signal GTB to transition from a high level to a low level. When the second control signal GTB is at a low level, the second switching element 12 is turned off, so that a current flows from the inductor 14 to the first power node NVI via the diode DA. Since the current flowing through the inductor 14 decreases, the current ILD flowing through the light emission element 15 also decreases.

When the detection voltage DTQ that is a detection result of the current ILD is different from the dimming voltage ACS, the output voltage ERQ of the error amplifier circuit 124 changes, so that the duty of the second control signal GTB changes. Thus, the current ILD is feedback-controlled so that the detection voltage DTQ matches the dimming voltage ACS. Such feedback control keeps the current ILD constant. Control for keeping the current ILD constant is called switching regulation control. The current ILD is maintained at a current value corresponding to the dimming voltage ACS, and when the processing device changes the dimming voltage ACS, the current ILD changes accordingly. That is, in the analog dimming mode, the light emission amount of the light emission element 15 is modulated by the dimming voltage ACS.

The analog dimming mode described above is used from a maximum value of the current ILD to a predetermined value. That is, when the light emission element 15 emits the light with high luminance, the analog dimming mode is used. On the other hand, when the current ILD is less than a predetermined value, that is, when the light emission element 15 emits the light with low luminance, the PWM dimming mode is used.

Figure 4:
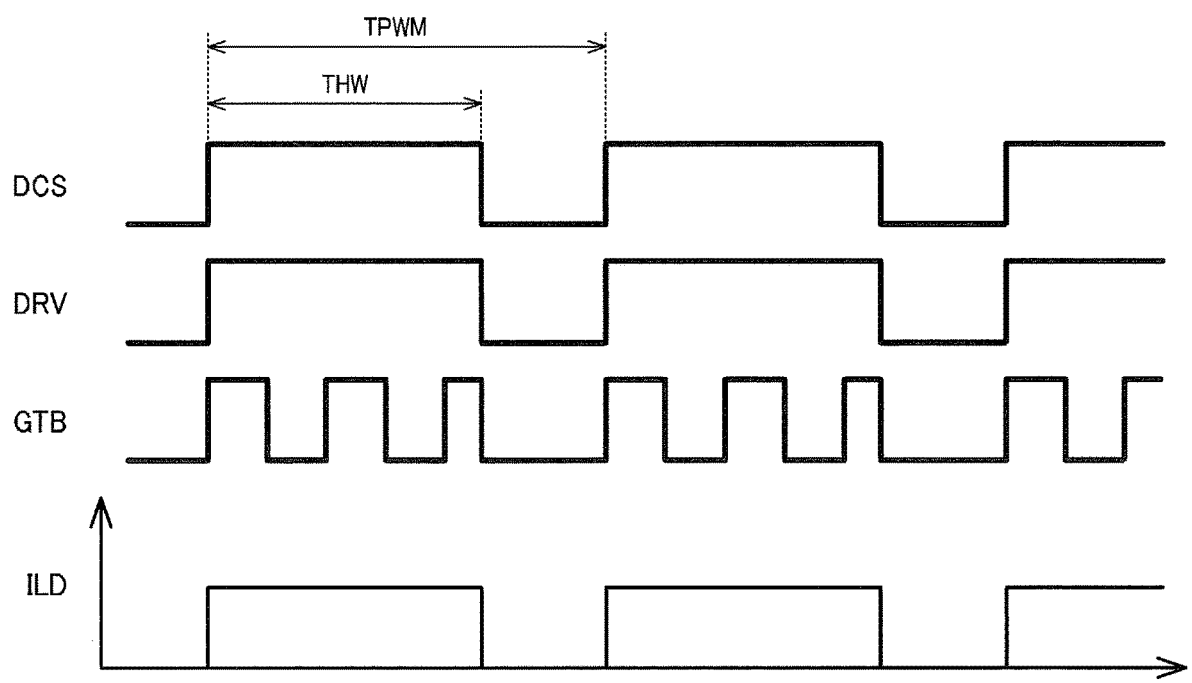
FIG. 4 is a waveform diagram in a PWM dimming mode.

FIG. 4 is a waveform diagram in the PWM dimming mode. A cycle of the PWM signal DCS is TPWM, and a period in which the PWM signal DCS is at a high level is THW. The duty of the PWM signal DCS is (THW/TPWM)× 100%. The frequency of the second control signal GTB is set higher than the frequency of the PWM signal DCS.

When the PWM signal DCS is at a high level, the first drive circuit 110 outputs the first control signal DRV of a high level, and turns on the first switching element 11. In this case, the second drive circuit 120 performs the switching regulation control by switching the second control signal GTB. Therefore, the current ILD corresponding to the dimming voltage ACS flows through the light emission element 15. When the PWM signal DCS is at a low level, the first drive circuit 110 outputs the first control signal DRV of a low level, and turns off the first switching element 11. The second drive circuit 120 sets the second control signal GTB to a low level. In this case, no current flows through the light emission element 15.

Since a time average of the current ILD flowing through the light emission element 15 is determined by the duty of the PWM signal DCS, the light emission amount is also determined by the duty of the PWM signal DCS. Thus, in the PWM dimming mode, the dimming control is performed by the duty of the PWM signal DCS. On the other hand, a current value when the current ILD flows through the light emission element 15 is ensured to be higher than the time average. In order to cause the laser diode to emit light, it is necessary for the current ILD of a threshold value or more to flow through the laser diode. By performing the PWM control as described above, it is possible to cause the laser diode to emit light by causing the current ILD of the threshold value or more to flow, and to perform dimming as the time average.

2. Method of Stopping Overcurrent

Next, a method of stopping the overcurrent when the light emission element is short-circuited to the ground will be described. First, the reason why the first switching element 11 is provided at a lower side of the light emission element 15 in the light source circuit 10 of FIG. 2 will be described. An upper side means the first power node NVI side from a circuit element, and the lower side means the second power node NGN side from the circuit element.

In order to ensure a maximum light quantity of the light emission element 15, a plurality of laser diodes are used. In this case, by coupling the plurality of laser diodes in series with each other, the current ILD flowing through each laser diode becomes common, and thus a circuit that controls the current flowing through the light emission element 15 is simplified. However, since the voltage drop in each laser diode is added in series, it is necessary to increase the first power VIN by that amount.

When the first switching element 11 is provided at the upper side of the light emission element 15 when the first power VIN is high, the first switching element 11 is operated in the vicinity of the first power VIN. Therefore, it is necessary to set a control signal input to the gate of the first switching element 11 to a high voltage in accordance with the first power VIN.

On the other hand, by providing the first switching element 11 at the lower side of the light emission element 15, the first switching element 11 can be operated at a lower voltage. Therefore, it is preferable to provide the first switching element 11 at the lower side of the light emission element 15.

Further, by providing the first switching element 11 at the lower side of the light emission element 15, an N-type transistor can be used for the first switching element 11 and the second switching element 12, which is advantageous in making parts common.

Next, an overcurrent when the light emission element 15 is short-circuited to the ground in the light source circuit 10 of FIG. 2 will be described. The short circuit means that an abnormal current path is generated other than a normal current path. That is, "short-circuited to ground" means that an abnormal current path is generated from a certain node to the ground due to adhesion of metal or dust, or due to poor mounting. A resistance value of the current path generated by the short circuit is not limited to zero Ω, and a case in which the resistance value is larger than zero Ω is also included in the short circuit.

When one end or the other end of the light emission element 15 is short-circuited to the ground, or when one end or the other end of any laser diode among the plurality of laser diodes included in the light emission element 15 is short-circuited to ground, a current flows from the first power VIN to the ground via the first resistor RCS and the light emission element 15. Since this current is not controlled, the light emission element 15 emits light unintentionally. In addition, since the current is not controlled, an overcurrent exceeding the rating of the light emission element 15 may flow.

As described above, in the present embodiment, the first switching element 11 is provided at the lower side of the light emission element 15. In this case, even when the first switching element 11 is turned off, the current path due to the ground short circuit is not interrupted. A method of protecting the light emission element 15 from the overcurrent will be described below.

Figure 5:
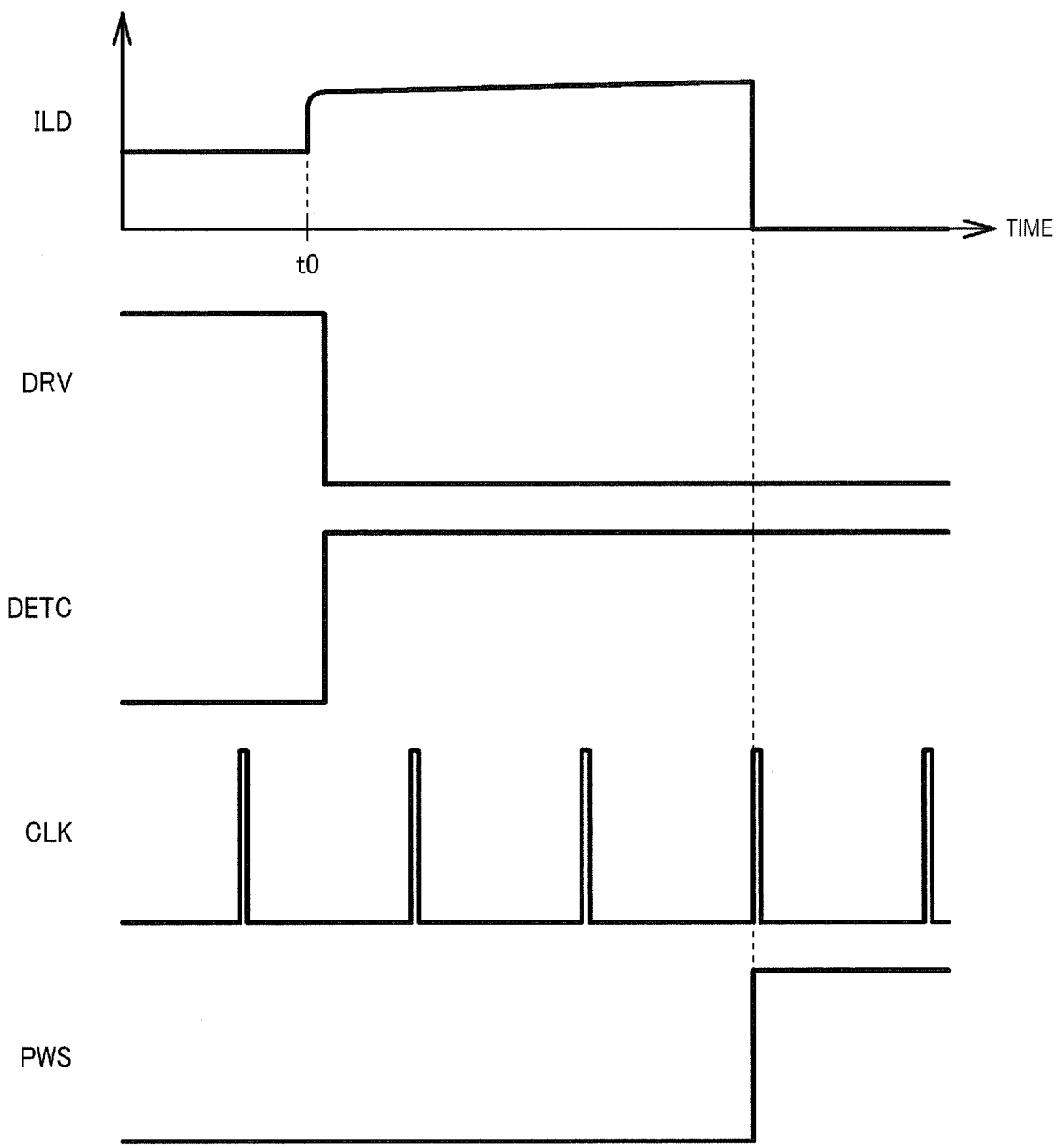
FIG. 5 is a waveform diagram for explaining an operation of a light emission control device.

FIG. 5 is a waveform diagram for explaining an operation of the light emission control device 100. In the following description, a high level is set to an active state and a low level is set to an inactive state, but the correspondence between a logical level and activeness is not limited to this.

As shown in FIG. 5, it is assumed that the light emission element 15 is short-circuited to the ground at time tO. Before time tO, the first control signal DRV is at a high level, and the first switching element 11 is turned on. Then, the second drive circuit 120 performs turning on/off control of the second switching element 12, thereby regulating the current ILD flowing through the light emission element.

When the light emission element 15 is short-circuited to the ground at time tO, the current ILD flowing through the light emission element 15 increases, and thus a potential difference across the first resistor RCS becomes large. The detection circuit 131 detects whether or not a potential difference across the first resistor RCS is larger than a predetermined value. Specifically, when the potential difference across the first resistor RCS becomes large, the detection voltage DTQ output by the current detection circuit 123 becomes large. The detection circuit 131 compares the detection voltage DTQ with a reference voltage.

When the potential difference across the first resistor RCS exceeds a predetermined value, the detection circuit 131 changes the detection signal DETC from a low level to a high level. When the detection signal DETC is at a high level, the operation control circuit 133 outputs the signal DRVB of a low level, and based on the signal DRVB, the first drive circuit 110 outputs the first control signal DRV of a low level. That is, when the detection signal DETC is at a high level, the first switching element 11 is turned off regardless of the logic level of the PWM signal DCS. This state is referred to as a drive stop state.

The operation control circuit 133 changes a power stop signal PWS from a low level to a high level after the detection signal DETC becomes a high level. Specifically, the operation control circuit 133 sets the power stop signal PWS to a high level when a state where the detection signal DETC is at a high level continues for a predetermined period. More specifically, the operation control circuit 133 sets the power stop signal PWS to a high level when the clock signal CLK having a predetermined number of clocks is input in a state where the detection signal DETC is at a high level. In FIG. 5, the predetermined number of clocks is 3, but the present disclosure is not limited thereto, and it may be 1 or more.

The power stop signal PWS is output from the terminal TPWS and is input to a power source circuit that supplies the first power VIN to the first power node NVI. An example of the power source circuit is shown in FIG. 6.

Figure 6:
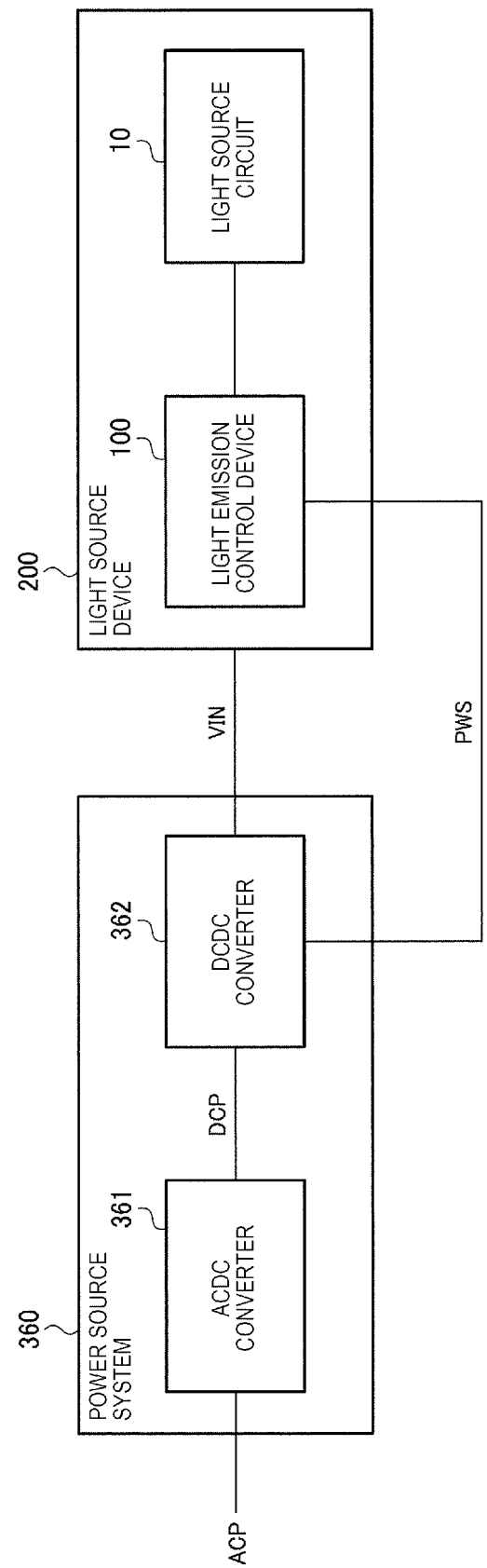
FIG. 6 is a configuration example of a power source system for supplying a power to the light source device.

FIG. 6 is a configuration example of a power source system 360 for supplying a power to the light source device 200. The power source system 360 includes an ACDC converter 361 that converts an AC power ACP to a DC power DCP, and a DCDC converter 362 that step-down converts the DC power DCP to the first power VIN. The DCDC converter 362 corresponds to a power source circuit that supplies the first power VIN to the first power node NVI.

The power stop signal PWS is input to the DCDC converter 362. When the power stop signal PWS is at a high level, the DCDC converter 362 stops output of the first power VIN. Specifically, when the power stop signal PWS is at a high level, the DCDC converter 362 stops conversion operation. For example, the DCDC converter 362 is a switching regulator, and the conversion operation is stopped by stopping the switching operation. Alternatively, the DCDC converter 362 may be a linear regulator using an operational amplifier, and the conversion operation may be stopped by stopping the operation of the operational amplifier.

As shown in FIG. 5, when the power stop signal PWS changes from a low level to a high level, the DCDC converter 362 stops output of the first power VIN, and thus a current is not supplied to the light emission element 15. That is, although the light emission element 15 is short-circuited to the ground, the current ILD flowing through the light emission element becomes zero because the DCDC converter 362 serving as a current source is stopped. Thus, the light emission element 15 can be protected from the overcurrent.

According to the present embodiment, when it is detected that the potential difference across the first resistor RCS is larger than a predetermined value, the light emission control circuit 101 sets the first control signal DRV to a drive stop state to be inactive. As a result, the first switching element 11 is turned off, the current path passing through the first switching element 11 is interrupted, and accordingly no current flows through the light emission element 15 under the normal state.

On the other hand, when the light emission element 15 is short-circuited to the ground, a current flows through the light emission element 15 even when the first switching element 11 is turned off. In the present embodiment, the light emission control circuit 101 decides whether or not the potential difference across the first resistor RCS is larger than a predetermined value in the drive stop state. Thus, the light emission control circuit 101 can decide whether or not an overcurrent flows through the light emission element 15 due to the short circuit of the light emission element 15 to the ground. When it is detected that the potential difference across the first resistor RCS is larger than a predetermined value in the drive stop state, the light emission control circuit 101 can stop current supply from the power source to the light emission element 15 by causing the power stop signal PWS to be active.

In the above description, a state where the first control signal DRV is inactive is referred to as the drive stop state. However, in the drive stop state, it is only necessary that at least one of the first control signal DRV and the second control signal GTB is inactive. That is, in the drive stop state, the light emission control circuit 101 may cause any one of the first control signal DRV and the second control signal GTB to be inactive, or may cause both the first control signal DRV and the second control signal GTB to be inactive. When the second control signal GTB is inactive in the drive stop state, the detection signal DETC is input to the control signal output circuit 121. When the detection signal DETC is active, the control signal output circuit 121 causes the second control signal GTB to be inactive to turn off the second switching element 12.

3. Detailed Configuration Example

Figure 7:
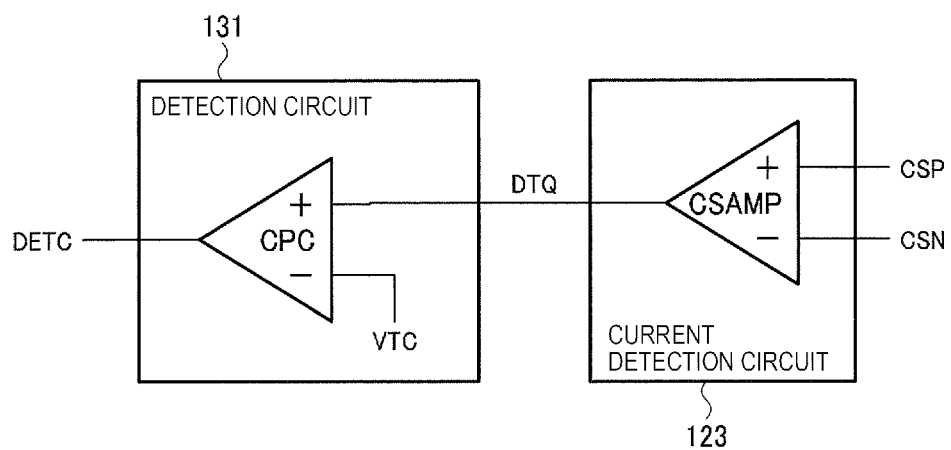
FIG. 7 is a detailed configuration example of a current detection circuit and a detection circuit.

FIG. 7 is a detailed configuration example of the current detection circuit 123 and the detection circuit 131. The current detection circuit 123 includes a differential input single-ended output amplifier circuit CSAMP. The amplifier circuit CSAMP amplifies the potential difference (CSP−CSN) input to the current detection circuit 123 with a predetermined gain, and outputs the amplified voltage as the detection voltage DTQ.

The detection circuit 131 includes a comparator CPC. The comparator CPC compares the detection voltage DTQ with a reference voltage VTC and outputs the detection signal DETC that is a result thereof. The reference voltage VTC corresponds to a predetermined value for deciding a potential difference (CSP−CSN). The comparator CPC outputs the detection signal DETC of a low level when DTQ<VTC, and outputs the detection signal DETC of a high level when DTQ>VTC.

Figure 8:
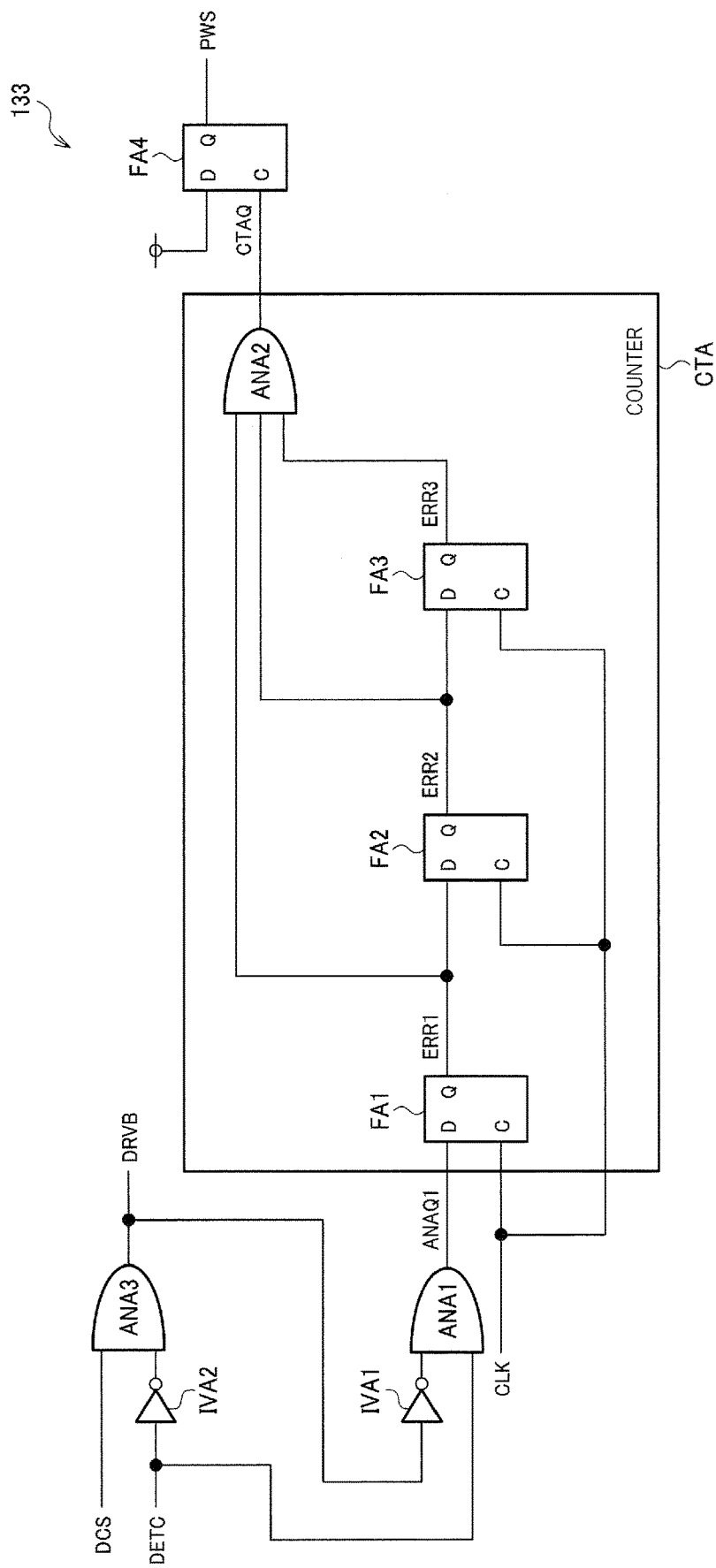
FIG. 8 is a detailed configuration example of an operation control circuit.

FIG. 8 is a detailed configuration example of the operation control circuit 133. The operation control circuit 133 includes a counter CTA, AND circuits ANA1 and ANA3, inverters IVA 1 and IVA 2, and a latch circuit FA4. The counter CTA includes latch circuits FA1 to FA3 and an AND circuit ANA2. The latch circuits FA1 to FA4 are, for example, dynamic flip-flop circuits. An operation of the operation control circuit 133 will be described below with reference to a waveform diagram shown in FIG. 9. Here, it is assumed that the PWM signal DCS is at a high level.

The AND circuit ANA3 outputs a logical product of a logic inversion signal of the detection signal DETC and the PWM signal DCS as a signal DRVB. When the light emission element 15 is short-circuited to the ground, the detection signal DETC changes from a low level to a high level, and thus the signal DRVB changes from a high level to a low level.

The AND circuit ANA1 outputs a logical product of a logic inversion signal of the signal DRVB and the detection signal DETC as a signal ANAQ1. When the detection signal DETC changes from a low level to a high level and the signal DRVB changes from a high level to a low level, the signal ANAQ1 changes from a low level to a high level.

The counter CTA counts the number of clocks of the clock signal CLK when the signal ANAQ1 is at a high level. Specifically, the clock signal CLK is input to clock terminals of the latch circuits FA1 to FA3. After the signal ANAQ1 has changed from a low level to a high level, the latch circuit FA1 latches the signal ANAQ1 at the rising edge of the first clock signal CLK. Therefore, an output signal ERR1 of the latch circuit FA1 becomes a high level. Similarly, after the signal ANAQ1 has changed from a low level to a high level, the latch circuits FA2 and FA3 latch the signals ERR1 and ERR2 at the rising edges of the second and third clock signals CLK. Therefore, output signals ERR2 and ERR3 of the latch circuits FA2 and FA3 become a high level.

The AND circuit ANA2 outputs a logical product of the output signals ERR1 to ERR3 as a signal CTAQ. After the signal ANAQ1 changes from a low level to a high level, the signal CTAQ changes from a low level to a high level at the rising edge of the third clock signal CLK.

The signal CTAQ is input to a clock terminal of the latch circuit FA4. The latch circuit FA4 takes the high level at the rising edge of the output signal CTAQ. Therefore, the power stop signal PWS output from the latch circuit FA4 changes from a low level to a high level.

Figure 9:
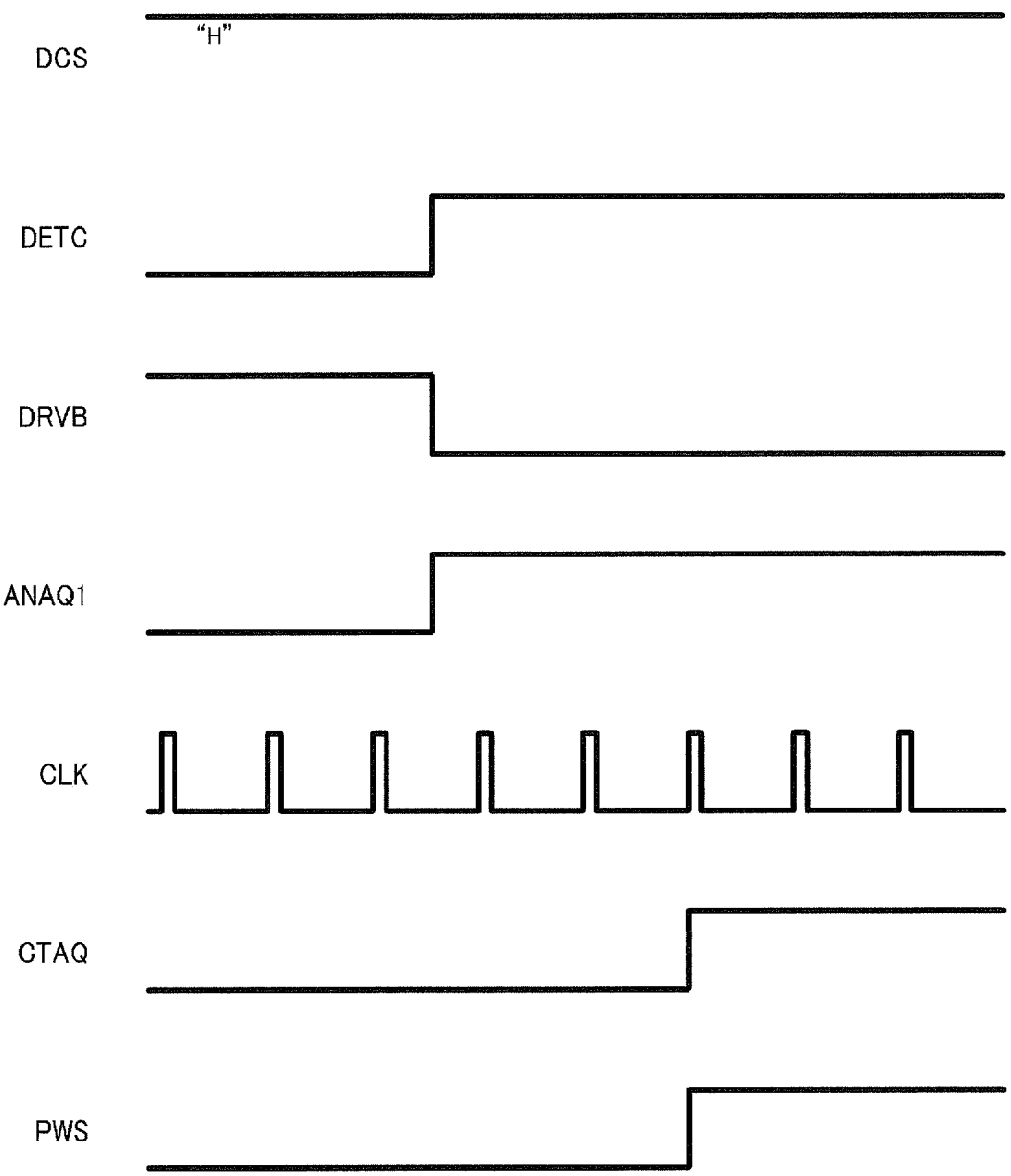
FIG. 9 is a waveform diagram for explaining an operation of the operation control circuit.

As described above, the counter CTA counts the number of clocks of the clock signal CLK in a state where the signal DRVB is at a low level and the detection signal DETC is at a high level. The state where the signal DRVB is at a low level corresponds to a drive stop state. Further, the state where the detection signal DETC is at a high level corresponds to a state where it is detected that the potential difference across the first resistor RCS is larger than a predetermined value. When the number of clocks counted by the counter reaches a predetermined number, the operation control circuit 133 changes the power stop signal PWS from a low level to a high level. In FIG. 9, the predetermined number is 3.

When the PWM signal DCS is at a low level, the signal DRVB is at a low level regardless of the logic level of the detection signal DETC. That is, when the detection signal DETC changes from a low level to a high level, the signal DRVB is maintained at a low level, and the signal ANAQ1 changes from a low level to a high level. Then, after the signal ANAQ1 changes from a low level to a high level, the power stop signal PWS changes from a low level to a high level at the rising edge of the third clock signal CLK. In this manner, when the PWM signal DCS is at a low level, it is originally in a drive stop state. Therefore, when the PWM signal DCS is at a low level, the operation control circuit 133 changes the power stop signal PWS from a low level to a high level when the number of clocks counted by the counter CTA reaches a predetermined number in a state where it is decided that the potential difference across the first resistor RCS is larger than a predetermined value.

4. Projection-Type Video Display Apparatus

FIG. 10 is a configuration example of a projection-type video display apparatus 400 including the light source device 200. The projection-type video display apparatus 400 is an apparatus that projects a video on a screen, and is also called a projector. The projection-type video display apparatus 400 includes the light source device 200, a processing device 300, an operation section 310, a storage section 320, a communication section 330, a display device 340, and an optical system 350. The light source device 200 includes the light emission control device 100 and the light source circuit 10.

The communication section 330 performs communication with an information processing device such as a PC. The communication section 330 is various video interfaces such as a VGA standard, a DVI standard, and an HDMI (HDMI is a registered trademark) standard. Alternatively, the communication section 330 may be a communication interface such as a USB standard or a network interface such as a LAN. The storage section 320 stores the image data input from the communication section 330. The storage section 320 may function as a working memory for the processing device 300. The storage section 320 is various storage devices such as a semiconductor memory or a hard disk drive. The operation section 310 is a user interface for the user to operate the projection-type video display apparatus 400. For example, the operation section 310 is a button, a touch panel, a pointing device, a character input device, or the like. The processing device 300 is a processor such as a CPU or a MPU. The processing device 300 transmits the image data stored in the storage section 320 to the display device 340. In addition, the processing device 300 performs dimming control by outputting a PWM signal and a dimming voltage to the light emission control device 100. The display device 340 includes a liquid crystal display panel and a display driver that displays an image on the liquid crystal display panel based on the image data. Light enters the liquid crystal panel from the light source circuit 10, and the light transmitted through the liquid crystal panel is projected onto a screen by the optical system 350. In FIG. 10, a light path is indicated by dotted arrows.

The light emission control device of the present embodiment described above controls the first switching element and the second switching element of the light source circuit. The light source circuit includes the first resistor, the light emission element, and the first switching element provided in series in this order between the first power node and the first node. The light source circuit includes the inductor, the second switching element, and the second resistor provided in series between the first node and the second power node. The light emission control device includes the detection circuit and the light emission control circuit. The detection circuit detects whether or not the first potential difference that is the potential difference across the first resistor is larger than a predetermined value. The light emission control circuit outputs the first control signal for controlling turning on/off of the first switching element and the second control signal for controlling turning on/off of the second switching element. The light emission control circuit sets at least one of the first control signal and the second control signal to the drive stop state to be inactive, when it is detected that the first potential difference is larger than the predetermined value. The light emission control circuit causes the power stop signal for providing an instruction to stop power supply to the first power node to be active, when it is detected that the first potential difference is larger than the predetermined value in the drive stop state.

In the present embodiment, the first switching element and the second switching element are provided at the lower side of the light emission element. According to the present embodiment, when it is detected that the potential difference across the first resistor is larger than a predetermined value, at least one of the first control signal and the second control signal is inactive. That is, setting is performed to the drive stop state. As a result, at least one of the first switching element and the second switching element is turned off, the current path from the light emission element to the lower side is interrupted, and accordingly no current flows through the light emission element under the normal state.

However, when the light emission element is short-circuited to the ground, a current flows from the light emission element to the ground via the short circuit path even in the operation stop state. In the present embodiment, it is decided whether or not the potential difference across the first resistor is larger than a predetermined value in the drive stop state. Thus, it is decided whether or not an overcurrent flows through the light emission element due to the short circuit of the light emission element to the ground.

When it is detected that the potential difference across the first resistor is larger than a predetermined value in the drive stop state, the power stop signal is active, whereby the current supply from the power source to the light emission element is stopped. Thus, even when the switching element is provided at the lower side of the light emission element, the light emission element can be protected from the overcurrent when the light emission element is short-circuited to the ground.

In the present embodiment, the light emission control circuit may output the power stop signal when a state in which it is decided that the first potential difference is larger than a predetermined value continues for a predetermined period in the drive stop state.

In the present embodiment, when the first potential difference becomes smaller than a predetermined value in the drive stop state, it is determined that the overcurrent does not flow through the light emission element. That is, it is possible to determine that the overcurrent flows through the light emission element only when a state where the first potential difference is larger than a predetermined value continues even after the drive stop state. According to the present embodiment, by providing a predetermined period, it is possible to decide whether or not a state where the first potential difference is larger than a predetermined value continues even after the drive stop state.

In the present embodiment, the light emission control circuit may include a counter that counts the number of clocks of the clock signal in a state where it is detected that the first potential difference is larger than a predetermined value in the drive stop state. The light emission control circuit may output the power stop signal when the number of clocks counted by the counter reaches a predetermined number.

According to the present embodiment, when the number of clocks counted by the counter reaches a predetermined number in a state where it is detected that the first potential difference is larger than a predetermined value in the drive stop state, the power stop signal is output. The predetermined number of clocks corresponds to the above predetermined period. That is, according to the present embodiment, the light emission control circuit can output the power stop signal when a state in which it is decided that the first potential difference is larger than a predetermined value continues for a predetermined period in the drive stop state.

In the present embodiment, the light emission control circuit may determine that the overcurrent has flowed through the light emission element, when the detection circuit detects that the first potential difference is larger than the predetermined value.

A potential difference across the first resistor is generated by a current flowing through the light emission element. That is, the current flowing through the light emission element can be detected based on the potential difference across the first resistor. According to the present embodiment, the detection circuit detects whether or not the first potential difference is larger than the predetermined value, whereby it is possible to determine whether or not the overcurrent has flowed through the light emission element.

In the present embodiment, the light emission control circuit may include the current detection circuit that detects the current flowing through the light emission element based on the first potential difference. The detection circuit may detect whether or not the first potential difference is larger than a predetermined value based on a current detection result of the current detection circuit. The light emission control circuit may perform PWM control of the second control signal based on the current detection result and a second potential difference that is a potential difference across the second resistor.

In this way, the switching regulation control of the current flowing through the light emission element can be performed based on the detection result of the current flowing through the light emission element and the detection result of the current flowing through the second switching element. In the present embodiment, the current flowing through the light emission element is detected by the current detection circuit. Therefore, the detection circuit can detect whether or not the first potential difference is larger than a predetermined value based on the current detection result of the current detection circuit.

In addition, in the present embodiment, the light emission control circuit may output the power stop signal for stopping the operation of the power source circuit to the power source circuit that supplies the first power to the first power node.

In this way, the light emission control circuit can stop the operation of the power source circuit when it is detected that the first potential difference is larger than a predetermined value in the drive stop state. Thus, even when the light emission element is short-circuited to the ground, current supply to the light emission element from the power source circuit is stopped, and thus the light emission element can be protected from the overcurrent.

The light source device according to the present embodiment includes the light emission control device described in any of the above and the light source circuit.

In the present embodiment, the light source device may include the power source circuit that supplies the first power to the first power node. The light emission control circuit may output the power stop signal to the power source circuit.

The projection-type video display apparatus according to the present embodiment includes the light source device described in any of the above and the processing device that controls the light source device.

Although the present embodiments have been described in detail above, it will be easily understood by those skilled in the art that many modified examples can be made without departing from the novel matters and effects of the present disclosure. Accordingly, all such modified examples are intended to be included within the scope of the present disclosure. For example, a term described at least once together with a different term having a broader meaning or the same meaning in the specification or the drawings can be replaced with a different term anywhere in the specification or the drawings. All combinations of the present embodiment and the modified examples are also included in the scope of the present disclosure. Further, the configurations and operations of the light emission control circuit, the light emission control device, the light source circuit, the light source device, and the projection-type video display apparatus are not limited to those described in the present embodiments, and various modifications can be made.

What is claimed is:

1. A light emission control device for controlling a first switching element and a second switching element of a light source circuit including a first resistor, a light emission element, and the first switching element provided in series in this order between a first power node and a first node, and an inductor, the second switching element, and a second resistor provided in series between the first node and a second power node, the light emission control device comprising:

a detection circuit detecting whether or not a first potential difference across the first resistor is larger than a predetermined value; and a light emission control circuit outputting a first control signal for controlling turning on/off of the first switching element and a second control signal for controlling turning on/off of the second switching element, wherein the light emission control circuit
sets at least one of the first control signal and the second control signal to a drive stop state to be inactive, when it is detected that the first potential difference is larger than the predetermined value, and
causes a power stop signal for providing an instruction to stop power supply to the first power node to be active, when it is detected that the first potential difference is larger than the predetermined value in the drive stop state.

2. The light emission control device according to claim 1, wherein
the light emission control circuit outputs the power stop signal, when a state where it is decided that the first potential difference is larger than the predetermined value continues for a predetermined period in the drive stop state.

3. The light emission control device according to claim 2, wherein
the light emission control circuit
includes a counter counting the number of clocks of a clock signal in a state where it is detected that the first potential difference is larger than the predetermined value in the drive stop state, and
outputs the power stop signal, when the number of clocks counted by the counter reaches a predetermined number.

4. The light emission control device according to claim 1, wherein
the light emission control circuit determines that an overcurrent flows through the light emission element, when the detection circuit detects that the first potential difference is larger than the predetermined value.

5. The light emission control device according to claim 1, wherein
the light emission control circuit includes a current detection circuit detecting a current flowing through the light emission element based on the first potential difference,
the detection circuit detects whether or not the first potential difference is larger than the predetermined value based on a current detection result of the current detection circuit, and
the light emission control circuit performs PWN control on the second control signal based on the current detection result and a second potential difference that is a potential difference across the second resistor.

6. The light emission control device according to claim 1, wherein
the light emission control circuit outputs the power stop signal for stopping an operation of a power source circuit supplying a first power to the first power node, to the power source circuit.

7. A light source device comprising:
the light emission control device according to claim 1; and
the light source circuit.

8. The light source device according to claim 7, further comprising:

a power source circuit supplying a first power to the first power node, wherein
the light emission control circuit outputs the power stop signal to the power source circuit.

9. A projection-type video display apparatus comprising:
the light source device according to claim 7; and
a processing device controlling the light source device.

* * * * *